(12) United States Patent
Cutler

(10) Patent No.: US 10,554,928 B2
(45) Date of Patent: Feb. 4, 2020

(54) TELEPRESENCE DEVICE

(71) Applicant: MICROSOFT TECHNOLOGY LICENSING, LLC, Redmond, WA (US)

(72) Inventor: Ross Garrett Cutler, Clyde Hill, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/955,669

(22) Filed: Apr. 17, 2018

(65) Prior Publication Data

US 2019/0320135 A1 Oct. 17, 2019

(51) Int. Cl.
*H04N 7/14* (2006.01)
*H04N 13/271* (2018.01)
*H04N 13/243* (2018.01)

(52) U.S. Cl.
CPC .......... *H04N 7/142* (2013.01); *H04N 13/243* (2018.05); *H04N 13/271* (2018.05)

(58) Field of Classification Search
USPC .......................................... 348/14.01–14.09
See application file for complete search history.

(56) References Cited

U.S. PATENT DOCUMENTS

| | | | |
|---|---|---|---|
| 7,139,767 B1 | 11/2006 | Taylor et al. | |
| 8,432,432 B2 | 4/2013 | Cutler | |
| 9,681,096 B1* | 6/2017 | Motta | H04N 7/147 |
| 10,122,969 B1* | 11/2018 | Lim | H04N 7/147 |
| 2010/0329358 A1 | 12/2010 | Zhang et al. | |
| 2011/0199497 A1* | 8/2011 | Motta | H04N 7/144 348/218.1 |
| 2011/0292051 A1* | 12/2011 | Nelson | G06K 9/00281 345/467 |
| 2016/0099429 A1* | 4/2016 | Bruder | H01L 27/307 348/374 |
| 2016/0105640 A1* | 4/2016 | Travis | H04N 7/15 348/14.08 |

(Continued)

FOREIGN PATENT DOCUMENTS

WO 2018039071 A1 3/2018

OTHER PUBLICATIONS

Lin, et al., "A Geometric Analysis of Light Field Rendering", In International Journal of Computer Vision, vol. 58, No. 2, Jul. 1, 2004, pp. 121-138.

(Continued)

*Primary Examiner* — Maria El-Zoobi
(74) *Attorney, Agent, or Firm* — NovoTechIP International PLLC

(57) ABSTRACT

A telepresence device is disclosed, which includes a display and a camera array including cameras configured to capture images of a local subject through the display and output a plurality of local captured images. The telepresence device also includes a local tile selector configured to select a plurality of tiles from the plurality of local captured images based on remote subject point of view (POV) data received from a remote device. The local tile selector outputs local image data that comprises the plurality of selected tiles. The local image data is sent to the remote device to composite an image of the local subject.

30 Claims, 12 Drawing Sheets

(56) References Cited

U.S. PATENT DOCUMENTS

2016/0203607 A1* 7/2016 Muller .................. G06T 7/80
                                                    348/136
2018/0020201 A1  1/2018 Motta et al.
2019/0320142 A1 10/2019 Cutler

OTHER PUBLICATIONS

Tan, et al., "ConnectBoard: Enabling Genuine Eye Contact and Accurate Gaze in Remote Collaboration", In Journal of IEEE Transactions on Multimedia, vol. 13, No. 3, Jun. 1, 2011, pp. 466-473.

Yang, et al., "Eye Gaze Correction with Stereovision for Video Tele-Conferencing", In Proceedings of 7th European Conference on Computer Vision, May 28, 2002, 16 Pages.

Chen, Milton, "Leveraging the Asymmetric Sensitivity of Eye Contact for Videoconferencing", In Proceedings of the SIGCHI conference on Human factors in computing systems, Apr. 20, 2002, 8 Pages.

Stokes, Rembert R., "Human Factors and Appearance Design Considerations of the Mod II PICTUREPHONE; Station Set", In Journal of IEEE Transactions on Communication Technology, vol. 17, Issue 2, Apr. 1969, pp. 318-323.

Vertegaal, et al., "Explaining effects of eye gaze on mediated group conversations: amount or synchronization?", In Proceedings of the ACM conference on Computer supported cooperative work, Nov. 16, 2002, pp. 41-48.

Yang, et al., "Interactive 3D Teleconferencing with User-Adaptive Views", In Proceedings of the ACM SIGMM workshop on Effective telepresence, Oct. 15, 2004, pp. 50-51.

Adhikarla, et al., "Fast and Efficient Data Reduction Approach for Multi-Camera Light Field Display Telepresence Systems", In Proceedings of 3DTV Conference on Vision Beyond Depth, Oct. 7, 2013, pp. 1-4.

Graziosi, et al., "Introduction to Tiled Full Parallax Light Field Display and Requirements for FTV Discussion", In Publication of Motion Picture Expert Group, Feb. 23, 2016, 15 Pages.

"International Search Report and Written Opinion Issued in PCT Application No. PCT/US2019/025270", dated Jun. 28, 2019, 13 Pages.

"International Search Report and Written Opinion Issued in PCT Application No. PCT/US2019/025271", dated Jun. 28, 2019, 13 Pages.

* cited by examiner

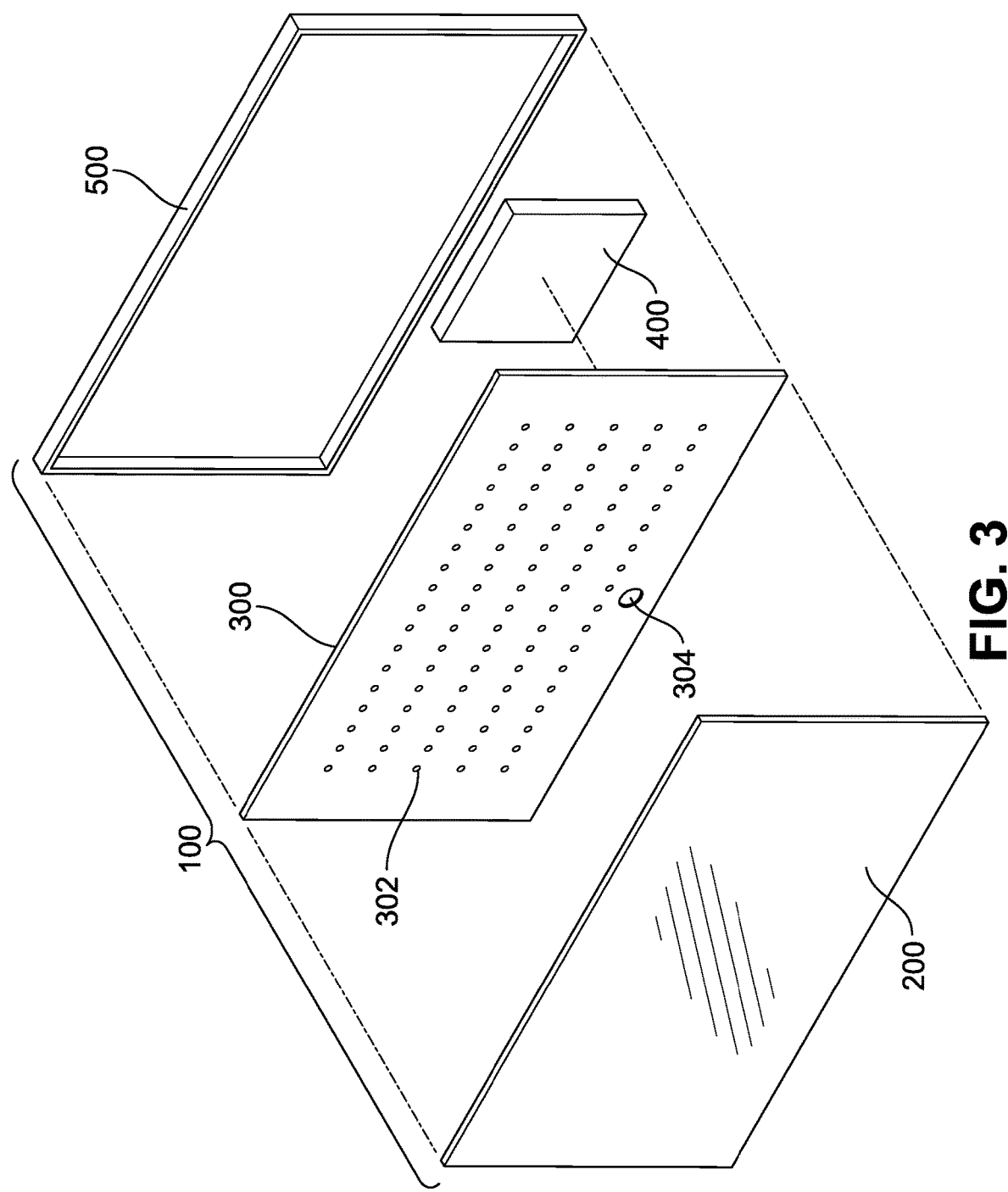

LOCAL: time=t1

LOCAL: time=t2

LOCAL: time=t2

REMOTE: time=t3

REMOTE: time=t3

LOCAL: time=t9

LOCAL: time=t9
display time=t10

TELEPRESENCE DEVICE

CROSS-REFERENCE TO RELATED APPLICATIONS

This application is related to co-pending U.S. patent application Ser. No. 15/955,672, titled "TELEPRESENCE DEVICE OPERATION METHOD", filed on Apr. 17, 2018, which is incorporated herein in its entirety.

BACKGROUND

Video conferencing technologies have become increasingly commonplace. Such technologies are now being used worldwide for a wide variety of both personal and business communications. For example, during a teleconference or other video conferencing session, individuals may "interact" and engage in face-to-face conversations through images and sound captured by digital cameras and transmitted to participants. In an attempt to provide more engaging video conferencing experiences, a set of technologies called "telepresence" have been introduced, which aim to allow participants at different geographical locations to feel as if they were present at the same location. The telepresence has provided certain enhancement to conventional video conferencing schemes, but there still remain significant areas for new and improved ideas for more immersive video conferencing experiences.

SUMMARY

In one general aspect, the instant application discloses a telepresence device including a display; a camera array including a plurality of cameras configured to capture images of a local subject through the display and output a plurality of local captured images; and a local tile selector configured to select a plurality of tiles from the plurality of local captured images based on remote subject point of view (POV) data received from a remote device, the local tile selector outputting local image data that comprises the plurality of selected tiles, wherein the local image data is sent to the remote device to composite an image of the local subject.

In another implementation, a telepresence device includes a display; a camera array comprising a plurality of cameras configured to capture images of a local subject through the display and output a plurality of local captured images; a point of view (POV) tracker configured to track a POV of the local subject and output local subject POV data; and a remote tile selector configured to select a plurality of tiles from remote image data based on the local subject POV data, the remote image data including a plurality of remote tiles received from a remote device, wherein the display displays an image of the remote subject composited based on the plurality of selected tiles.

In another implementation, a telepresence device includes a display; a camera array including a plurality of cameras configured to capture images of a local subject through the display and output a plurality of local captured images; a local tile selector configured to select a plurality of local tiles from the plurality of local captured images based on remote subject point of view (POV) data received from a remote device, the local tile selector outputting local image data that includes the plurality of selected local tiles; a POV tracker configured to track a POV of the local subject and output local subject POV data; and a remote tile selector configured to select, based on the local subject POV data, a plurality of remote tiles from remote image data received from the remote device, wherein the display displays an image of the remote subject composited based on the plurality of selected remote tiles.

In another implementation, a telepresence device includes means for displaying an image; means for capturing images of a local subject through the displaying means, the capturing means outputting a plurality of local captured images; and first means for selecting a plurality of first tiles from the plurality of local captured images based on remote subject point of view (POV) data received from a remote device, the first selecting means outputting local image data that comprises the plurality of first tiles, wherein the local image data is transmitted to the remote device.

In another implementation, a telepresence device includes a display; a plurality of cameras configured to capture images of a local subject through the display; and a local tile selector configured to select a plurality of tiles from the captured images of the local subject and convert the plurality of selected tiles to local subject image data that is usable by a remote device to render and display a 3D visual representation of the local subject, wherein the local subject image data comprises local subject point of view (POV) data that is usable by the remote device to maintain eye gazing between a remote device user and the 3D visual representation of the local subject.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 3 illustrates an explode view of an example telepresence device.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles unless expressly indicated.

This description is directed to a telepresence device that provides enhanced and more immersive experiences to videoconferencing participants located in different geographical locations. Through the resulting immersive experiences, the participants may feel essentially a same level of trust and empathy as being face-to-face to each other at a same location, which may reduce or eliminate the need to travel to a same location for a face-to-face meeting. To provide more immersive experiences, the telepresence device, where the remote participant is also using a similarly capable telepresence device, displays life-like images of a remote participant that are dynamically responsive in real-time to movement of the local participant, present a life-like geometry, and preserve eye gaze. The telepresence device provided at the remote location, if similarly capable, may provide the same immersive telepresence experience to the remote participant.

Figure 1:
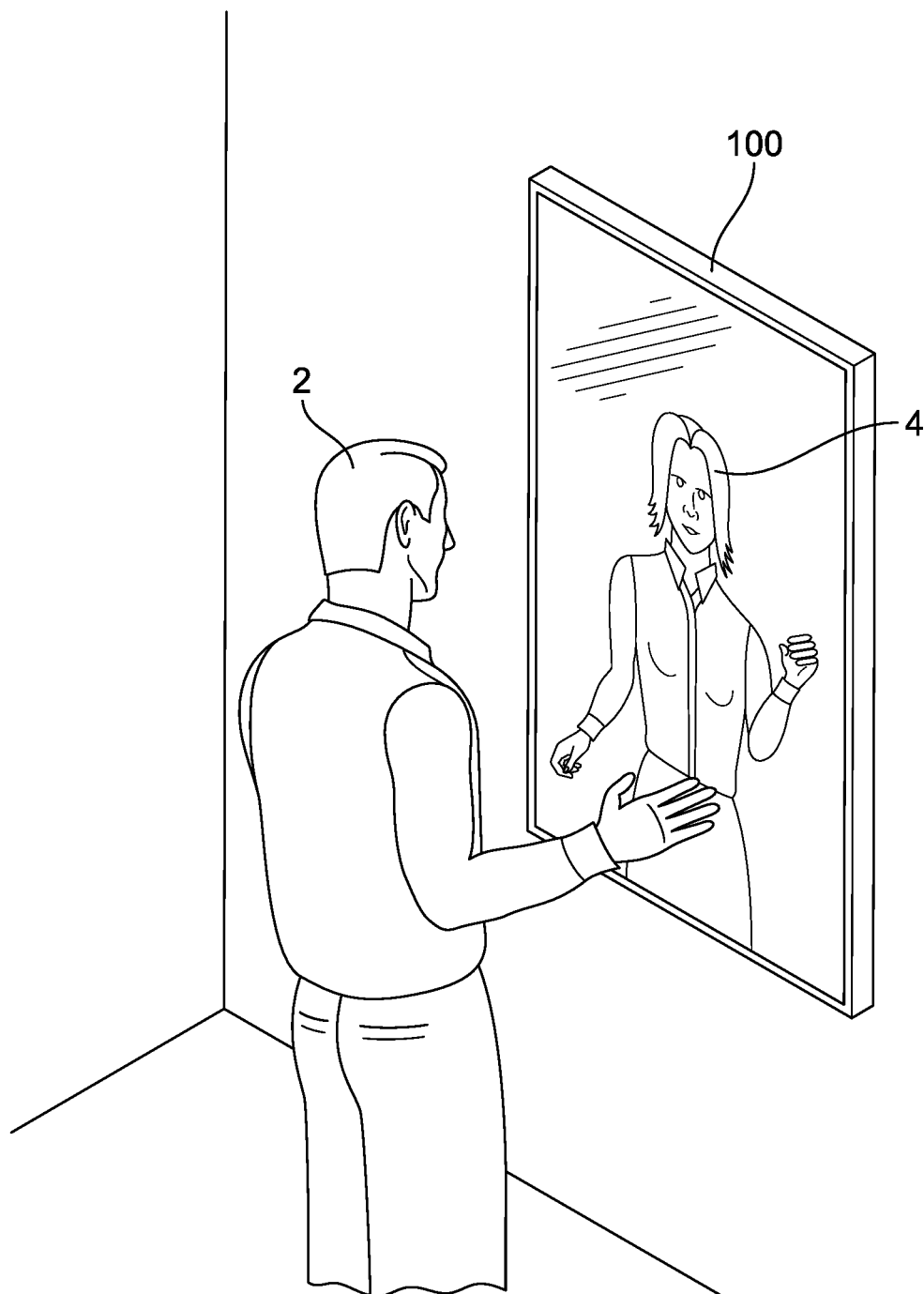
FIG. 1 illustrates a local subject looking at an image of a remote subject displayed on a telepresence device.

FIG. 1 shows an example of a telepresence device 100 arranged and operating to provide a telepresence communication session with a remote subject 4 (shown in an image displayed by the telepresence device 100) located at a geographically different location. The remote subject 4 may also be referred to as a "remote participant." In this example, and for purposes of discussion, the remote subject 4 is using a telepresence device that is essentially the same as the telepresence device 100. As shown in FIG. 1, the telepresence device 100 may be installed on a wall in a fixed manner at a height that generally corresponds to an expected or average eye height of a local subject 2. The local subject 4 may also be referred to as a "local participant." In the example shown in FIG. 1, the telepresence device 100 is installed at a height suitable for the local subject 2 to engage in a session while standing, although in other examples the telepresence device 100 may be installed at other heights, such as a height suitable for a seated subject. Due to its similarity in appearance to a window, such telepresence device 100 is referred to as a telepresence device. The telepresence device 100 may be implemented in different shapes and sizes and positioned at different heights. For example, although the telepresence device 100 is shown installed in a portrait orientation in FIG. 1, which improves immersiveness between standing subject, in other examples, such as for a seated subject, the telepresence device 100 may instead be installed in a landscape orientation. In some examples, the telepresence device 100 may be constructed to be height-adjustable (for example, to better accommodate local participants of different heights), movable, and/or mobile.

The telepresence device 100 may be configured to provide a user interface (not shown in FIG. 1) enabling the local subject 2 to control various operations of the telepresence device 100, including, for example, sending, receiving, and/or accepting invitations for conferencing sessions, conferencing session initiation and/or termination, volume and display adjustment, and/or recording. The user interface may be presented via a main display device of the telepresence device 100 or via an external unit, such as an external unit located next to the telepresence device 100 on the same wall. Alternatively, the user interface may be presented via a remote controller (not shown in FIG. 1) or via a mobile app executing on a mobile computing device such as a smartphone or tablet (not shown in FIG. 1) that the local subject 2 carries or is otherwise readily accessible to the local subject 2. The user interface may be configured to be responsive to voice commands (in some examples, with assistance of a digital assistant) and/or movements (for example, via gesture recognition) by the local subject 2.

Figure 2A:
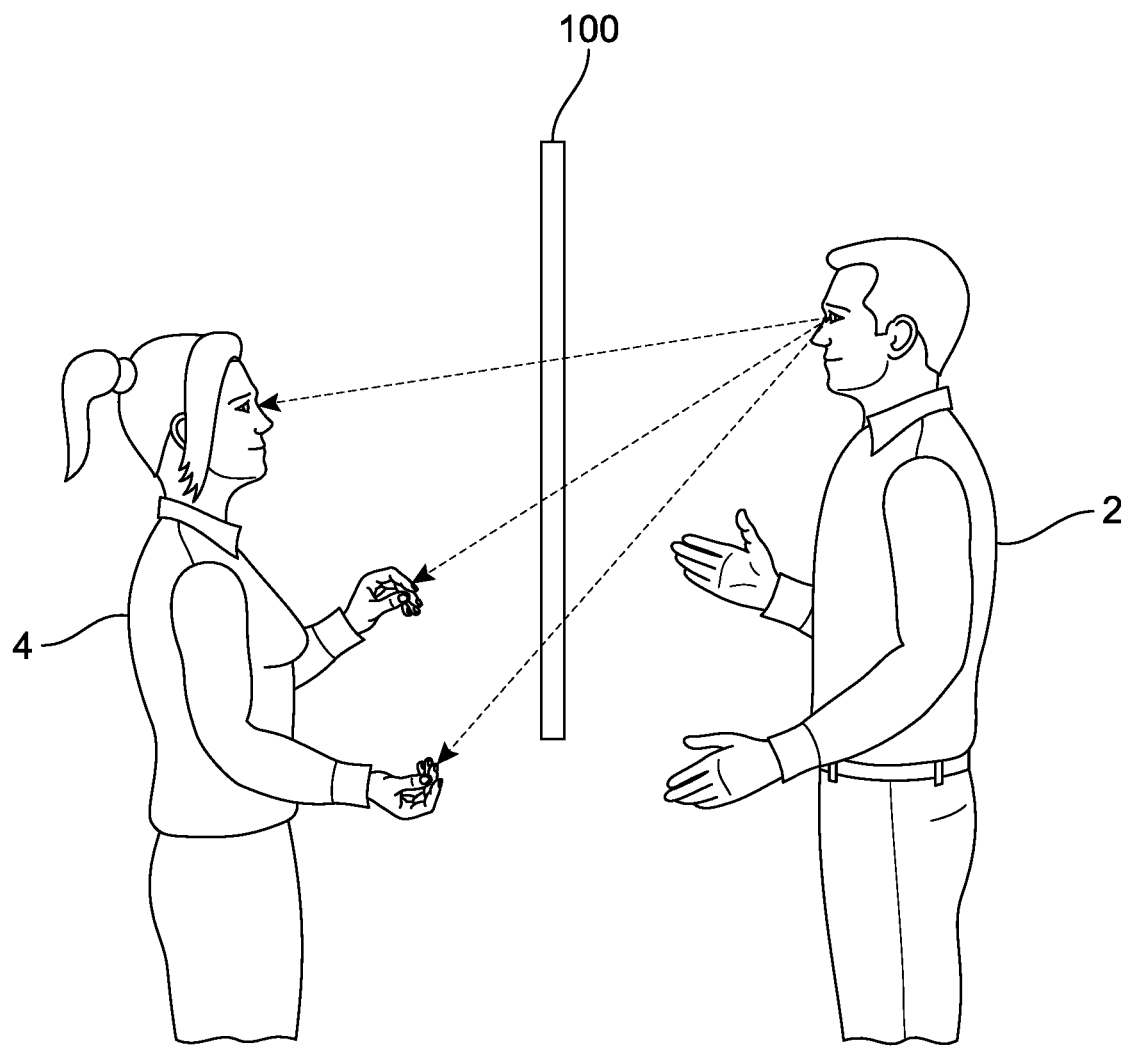
FIG. 2A illustrates the local and remote subjects of FIG. 1 standing face-to-face at the same geographical location.

FIG. 2A continues the example illustrated in FIG. 1, showing a synthetic arrangement of the remote subject 4 relative to the local subject 2 to illustrate the view of the remote subject 4 that the telepresence device 100 renders for the local subject 2. For the local subject 2, the appearance of the remote subject 4, including real-time responsiveness to movement of the local subject 2, is much as if the telepresence device 100 were replaced with a hypothetical transparent window with the local subject 2 and the remote subject 4 standing face to face on opposite sides of the hypothetical window, much as shown in FIG. 2A. In operation, the telepresence device 100 displays images of the remote subject 4 that from the perspective of the local subject 2 capable of preserving life-size geometry, presenting motion parallax, providing depth cues from motion, preserving eye gaze, and providing visual perspective that, in combination with real-time responsiveness to movement of the local subject 2, provides a highly engaging and immersive interactive communication experience between the local subject 2 and the remote subject 4.

For a hypothetical camera arranged at the remote end (not shown in FIG. 2A), images of which would be displayed to the local subject 2 with no or little latency (e.g., less than 300 ms), to be used to capture such images of the remote subject 4, the hypothetical camera would be moved, with little or no latency, to match an eye location of the local subject 2 at a distance well behind the telepresence device used to capture images of the remote subject 4. However, no such hypothetical camera or elimination or latency is actually available or practicable; instead, the cameras used to capture images of the remote subject 4 are at fixed positions within the shallow enclosure of the telepresence device at the remote end. At that distance from the remote subject 4, which is much shorter than the synthetic distance between the local subject 2 (or the above hypothetical camera) and the remote subject 4 shown in FIG. 2A, the shortened camera to subject distances distorts the image due to changing angles of light entering and recorded by the cameras.

Figure 2B:
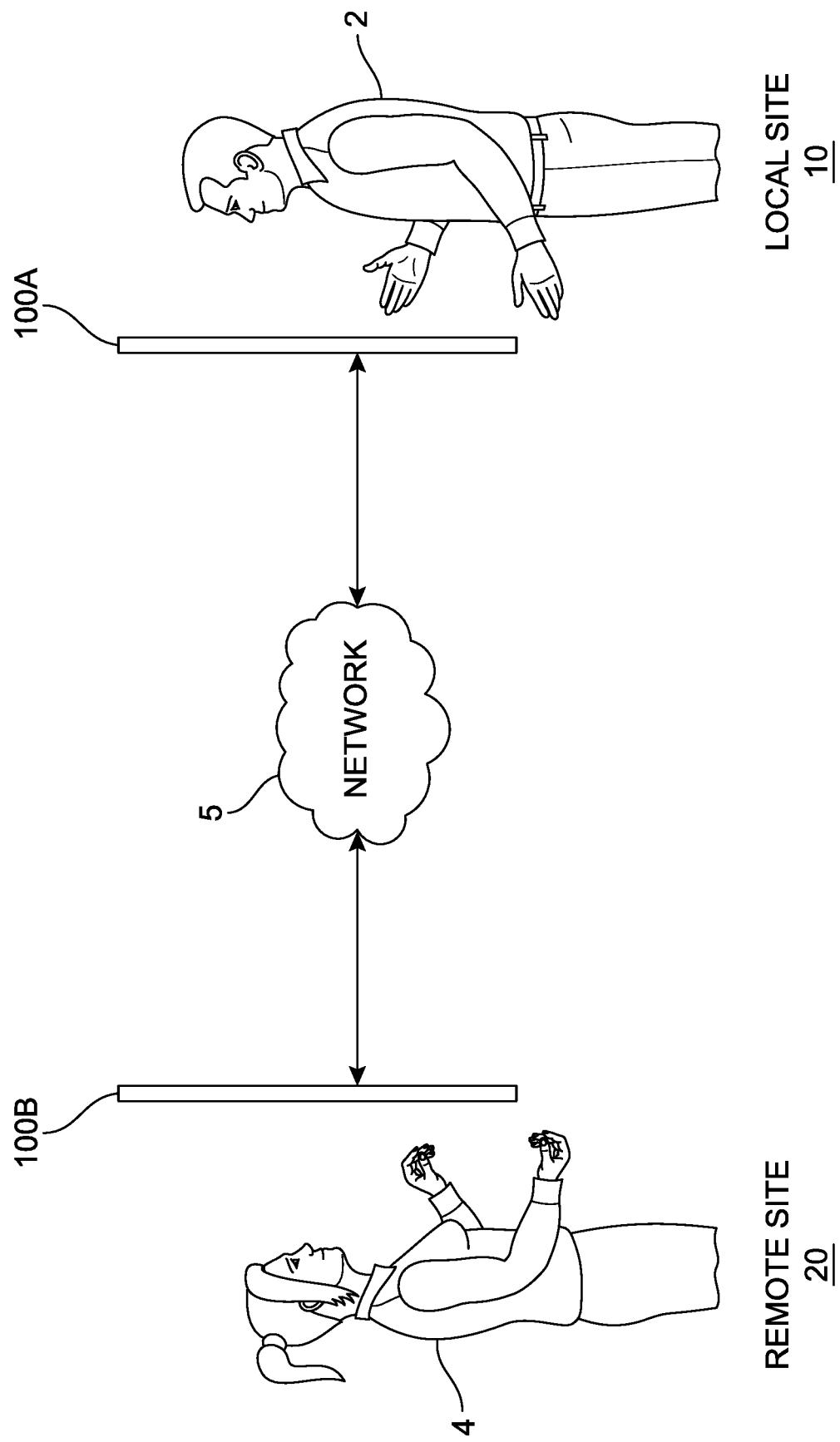
FIG. 2B illustrates the local and remote subjects of FIGS. 1 and 2A located at geographically different locations and conducting a videoconference using local and remote telepresence devices.

FIG. 2B continues the example of FIGS. 1 and 2A, and more accurately shows the local subject 2 and the remote subject 4 located at two geographically different locations, for example, at a local site 10 where a local telepresence device 100A is located and a remote site 20 where a remote telepresence device 100B is located, respectively. The local and remote telepresence devices 100A and 100B may be communicatively linked via a network 5, which may be a wired network, a wireless network, or a combination of any numbers thereof. As will be described in more detail in later examples, the telepresence devices 100A and 100B may be constructed such that images of the remote subject 4 are displayed on the local telepresence device 100A. Similarly, the remote telepresence device 100B may be arranged and configured to display images of the local subject 2. The images displayed by the telepresence devices 100A and 100B may, from the perspectives respective local subject 2 and remote subject 4, preserve and present visual features such as life-size geometry, motion parallax, depth cues from motion, eye gaze, and visual perspective that are responsive to real-time movements of the remote and local subjects 2 and 4.

FIG. 3 shows an exploded view of an example of the local telepresence device 100A shown in FIGS. 1, 2A, and 2B. For purposes of discussion, the remote telepresence device 100B is constructed in the same manner. The local telepresence device 100A may include, for example, a display 200, a camera array 300, a controller 400, and an enclosure 500. The display 200 may be transparent, semitransparent, or partially opaque such that light rays from an external environment can pass therethrough to the camera array 300. For example, the display 200 may be a transparent organic light-emitting diode (OLED) display. The display 200 may have front and rear main surfaces, which may in the form of a vertical plane, although in some examples the display 200 may be nonplanar, such as curved or segmented. The front main surface of the display 200 may be constructed to face the local subject 2 (shown in FIGS. 1, 2A, and 2B) and display video images to the local subject 2. The camera array 300 may be arranged to face the rear surface of the display 200 such that light rays received from the local subject 2 and the background external environment pass through the display 200 and captured by the camera array 300.

The camera array 300 may include a plurality of cameras 302 that face the display 200 to capture the light rays passing therethrough. The cameras 302 may include light field cameras that capture light field information emanating from a scene, including the intensity and directions of light rays in the scene. In some examples, some or all of the light field cameras 302 may be positioned behind the display 200 to capture images from the light received through the display 200. By placing the light field cameras 302 behind the display 200, subject gazes may generally be oriented more towards the light field cameras 302, greater numbers of the light field cameras 302 may be more easily included, the light field cameras 302 may be arranged to capture images of a subject (e.g., the male 12 in FIG. 2B) from more natural angles, and an additional non-display user-facing surface (such as a bezel) may not be necessary for the local telepresence device 100A. The light field cameras 302 may be positioned such that, when the local telepresence device 100A is operated, a leftmost camera 302 and a rightmost camera 302 may span a horizontal distance that is at least large enough, in most conditions, to capture a view around the local subject 2 located close to and within a field of view (FOV) of one or more of the light field cameras 302. Various other arrangements and numbers for the light field cameras 302 are also effective, such as, but not limited to, an array, along multiple parallel lines, or along perpendicular lines.

The light field cameras 302 may be evenly spread out with a predetermined distance therebetween. Alternatively, the light field cameras 302 may be more densely placed at a certain area to capture more visual information. For example, an area of the camera array 300 that is expected to capture a main or closer subject, e.g., the local subject 2, may be provided with more light field cameras 302. The rest of the camera array 300 expected to capture a background or farther subject may be provided with less light field cameras 302.

In addition to the light field cameras 302, the camera array 300 may include a plurality of depth cameras 304. The depth cameras 304 may be provided proportional to the light filed cameras 302. For example, the light field cameras 302 and the depth cameras 304 may be provided at a constant ratio (e.g., 1:1, 3:1, 8:1, etc.). The depth cameras 304 may include an array of IR structured-light scanners. Each IR structured-light scanner projects, through the display 200, a narrow band of light onto a 3D shaped surface of a subject and produce a line of illumination of the subject that can be collectively used for grayscale geometric reconstruction of the subject's surface shape and estimating the distance between the 3D scanner and subject.

Some or all of the depth cameras 304 may be positioned behind the display screen 200 to capture light for depth estimation through the display 200, as illustrated in the example of FIG. 3. By placing the depth camera 304 behind the display 200, greater numbers of the depth cameras 304 may be more easily included, and an additional non-display user-facing surface may not be necessary for the depth cameras 304. A depth estimate may also be referred to as an "estimated depth," "distance estimate," or "estimated distance." As described in more detail below, depth estimates obtained using the depth cameras 304 may be used to, among other things, determine when a subject has come into proximity to the local telepresence device 100A, determine a distance between the local telepresence device 100A and a subject, determine a position of a subject relative to the camera array 300, and/or identify discontinuities in a depth image and related depth image data used to perform image segmentation for a subject.

As known in the art, the maximum distance between the cameras 302 that does not cause aliasing artifact is a function of the minimum and maximum depth (or distance) of an object from the cameras 302. For example, where δ is a camera angular resolution of a pixel, D the distance between adjacent cameras, and $Z_{min}$ and $Z_{max}$ the bounds of Z depth of a scene:

$$D = \frac{2\delta}{Z_{min}^{-1} - Z_{max}^{-1}} \quad (1)$$

$$Z_{max} = \frac{D}{\frac{D}{Z_{min}} - 2\delta} \quad (2)$$

With cameras having a vertical FOV of 90 degrees and a vertical resolution of 1080 pixels, $Z_{min}$=400 mm, $Z_{max}$=1000 mm, and a camera array size of 600 mm×600 mm, the cameras 302 would be spaced at an interval of 1.9 mm, requiring a total number of about 96,000 cameras. However, by estimating depth information (for example, by use of the depth cameras 304) the number of the cameras 302 may be significantly reduced. For example, if one of 16 different depth levels is assigned to each pixel, then the spacing between cameras 302 may be increased to an interval of 30 mm, substantially reducing the total number of cameras 302 to about 400 cameras for the same 600 mm×600 mm area. Examples of such approaches are described in Zhouchen Lin and Heung-Yeung Shum. "A geometric analysis of light field rendering." International Journal of Computer Vision 58.2 (2004): 121-138, which is incorporated by reference herein in its entirety.

The controller 400 may include a logic subsystem, a data holding subsystem, a display controller, and a communications subsystem, and may be communicatively coupled to the display 200 and the camera array 300. The logic subsystem may include, for example, one or more processors configured to execute instructions and communicate with the other elements of the local telepresence device 100A according to such instructions to realize various aspects of this disclosure involving the local telepresence device 100A. Such aspects include, but are not limited to, configuring and controlling the other elements of the local telepresence device 100A, input and commands, communicating with other computer systems, and/or processing images captured by the camera array 300. The data holding subsystem may include one or more memory devices (such as, but not limited to, DRAM devices) and/or one or more storage devices (such as, but not limited to, flash memory devices). The data holding subsystem may include one or more media having instructions stored thereon which are executable by the logic subsystem, which cause the logic subsystem to realize various aspects of this disclosure involving the local telepresence device 100A. Such instructions may be included as part of firmware, an operating system, device drivers, application programs, or other executable programs. The communications subsystem may be arranged to allow the local telepresence device 100A to communicate with other computer systems. Such communication may be performed via, for example, wired or wireless data communication.

The enclosure 500 may be arranged to be mechanically coupled to the display 200 and enclose internal components of the local telepresence device 100A, including the camera array 300 and controller 400. The enclosure 260 may also be referred to as a "housing." When the local telepresence device 100A is assembled, the camera array 300 and the controller 400 may be all encapsulated by the single enclosure 500 and positioned behind the display 200. Alternatively, various elements and features of the local telepresence device 100A may be implemented across multiple devices. For example, a portion of the controller 300 may be provided by a computer system not enclosed by the enclosure 500, at least some of the cameras 302 and the depth cameras 304 may be included in one or more separate devices instead of being positioned behind the display 200, and/or at least some of the depth cameras 304 may be included in one or more separate devices instead of being positioned behind the display 200.

The camera array 300 may be constructed with any number of the light field cameras 302 and/or the depth cameras 304. However, when the camera array 300 is constructed with a large number of light field cameras 302, it may require a large number of data buses to transmit the image data captured by the light field cameras 302 and a large amount of data processing power to encode and process the captured image data, which may complicate the design and production of the local telepresence device 100A and may generate a large amount of heat without a proper cooling system. To alleviate these problems, the camera array 300 may be constructed by assembling a number of smaller image capturing units or modules.

Figure 4A:
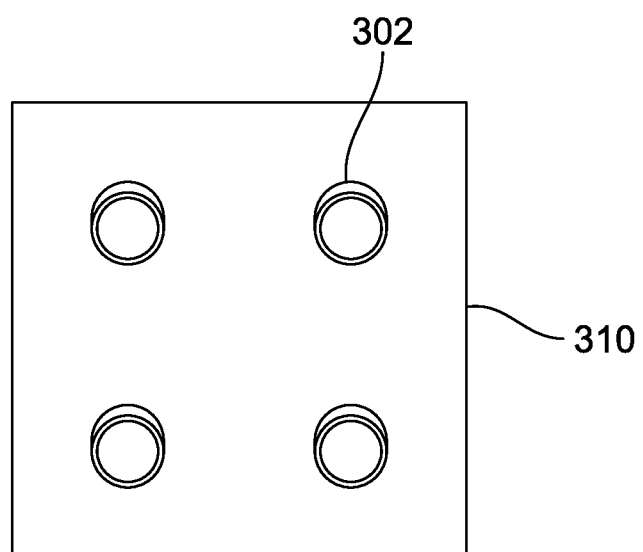
FIGS. 4A and 4B illustrate an example camera module of the telepresence device illustrated in FIG. 3.

FIG. 4A illustrates an example of a camera module 310, which may include one or more light field cameras 302. In some implementations, some or all of the camera modules 310 may include one or more light field cameras 302 only, one or more depth cameras 304 only, or a combination of one or more light field cameras 302 and one or more depth cameras 304. Although the camera module 310 shown in FIG. 4A includes four (4) light field cameras 302 arranged in a 2×2 array, the camera module 310 may be constructed to have a different number of light field cameras 302 and/or depth cameras 304 arranged in different numbers of rows and columns with different distances therebetween. For example, a camera array 300 including four hundred (400) light field cameras 302 arranged in a 20×20 array may be constructed by arranging twenty five (25) cameral modules 310 in a 5×5 array, where each camera module 310 has sixteen (16) light field cameras 302 arranged in a 4×4 array.

In some implementations, at least some of the light filed cameras 302 may be tilted to capture of a broader area of the subject, such as, for example, the top surfaces of the head and shoulder, the side surfaces of the head, arms and legs, etc. of the local subject 2. For example, as shown in FIG. 4A, the light field cameras arranged on the top and horizontal center of the display array 300 may be tilted downward, to capture the top surfaces of the head and shoulders of the local subject 2. An example image captured by the down-tilted light field camera 302 located at the top and horizontal center of the display array 300 is shown as an image 60A in FIG. 6. The light field cameras 302 may be tilted in different directions. For example, the light field cameras 302 located at left and right sides may be tilted toward the center of the camera array 300, and the light field cameras 302 located at the corners of the camera array 300 may be tilted diagonally toward the center of the camera array 300. The light field cameras 302 may also be tilted at varying degrees depending on their distances from the center of the camera array 300. For example, the greater the distance from the center of the camera array 300 to the light field camera 302 is, the greater the tilted angle of the light filed camera 302 may be.

In some implementations, the plurality of light field cameras 302 may be implemented with a view camera system. An example of the view camera system is shown and described in U.S. Pat. No. 7,495,694, titled "OMNI-DIRECTIONAL CAMERA WITH CALIBRATION AND UP LOOK ANGLE IMPROVEMENTS," issued on Feb. 24, 2009, which is incorporated herein by reference in its entirety. In a view camera system, an image sensor is mounted flat on a printed circuit board (PCB) and a corresponding lens is mounted on the image sensor. Instead of tilting the image sensor and lens together, in the view camera system, the lens is horizontally shifted such that the centers of the image sensor and lens are offset from each other, which in turn tilts the optical axis of the image sensor and lens combination. By controlling the horizontal shift direction and distance, the optical axis may be tilted at a desired up-look angle while ensuring that the image is completely captured by the sensor. In the view camera system, the image sensors do not need to be held above a surface at a tilted angle to achieve the desired tilt angle. Hence, the camera array 300 may be designed and manufactured in a simpler manner, and camera misalignment may be substantially reduced.

Figure 4B:
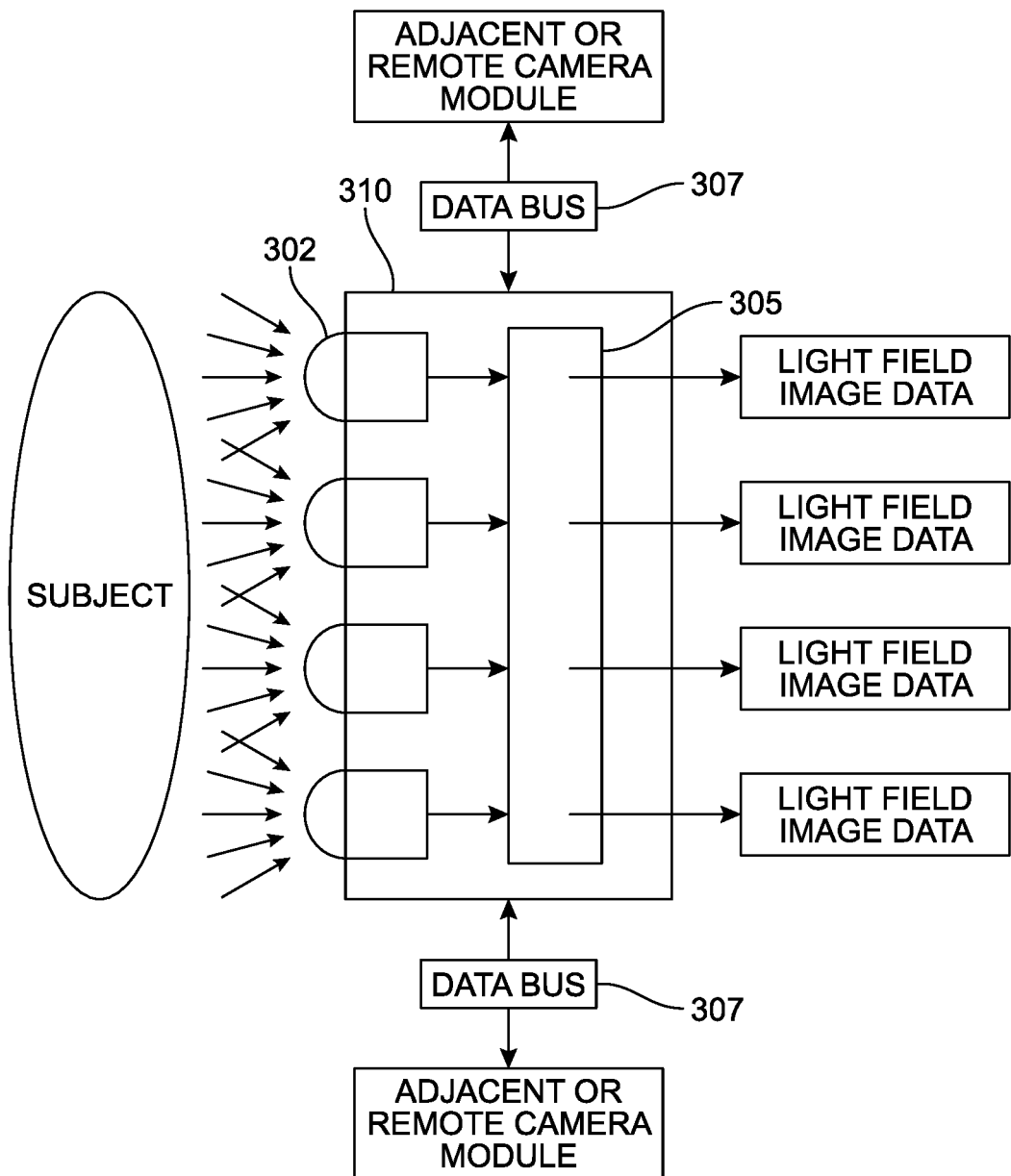

In some implementations, the camera module 310 may include one or more image processors 305, as illustrated in FIG. 4B. The image processor 305 may process the light field image data captured by the four (4) light field cameras 302. In some implementations, the image processor 305 may analyze and compare the captured light field image data to construct light field image data. In doing so, the image processor 305 may filter out at least some of the captured light field image data that is redundant or unnecessary for constructing light field image frames. In other implements, each light field camera 302 or a pair or group of light field cameras 302 may be provided with its own designated image processor (not shown). The designated image processor may be provided in addition to the image processor 305 to share the processing burden of the image processor 305. For example, the designated processors may filter out redundant or unnecessary light field images, and the image processor 305 may construct and output a stream of light field image frames. The camera array 310 may be configured with a field-programmable gate array (FPGA), a system on a chip (So) or other integration solutions.

In some implementations, the camera module 310 may be in communication with one or more other camera modules located adjacently or remotely via one or more data buses 307. For example, two camera modules 310 that are located at both horizontal, vertical or diagonal end portions of the camera array 300 may be in communication with each other via the data bus 307 to share the light field images captured from different points of views (POVs). Such shared light field images may then be processed by the image processor 305 to create light field images of the subject.

In some implementations, the light field cameras 302 and/or the image processor 305 may be in communication with the depth camera 304 (shown in FIG. 3). As described above, the depth camera 304 may provide the depth estimation of a subject. When the depth estimation of a subject is available, the light field cameras 302 may be positioned further from each other and still achieve the same or similar level of light field image capturing accuracy. Hence, the depth camera 304 may contribute to reducing the number of the light field cameras 302 required to construct the camera array 300. The image processor 305 may also use the depth estimation to filtering out the redundant or unnecessary light field image pixel, tile or fame data.

Figure 5:
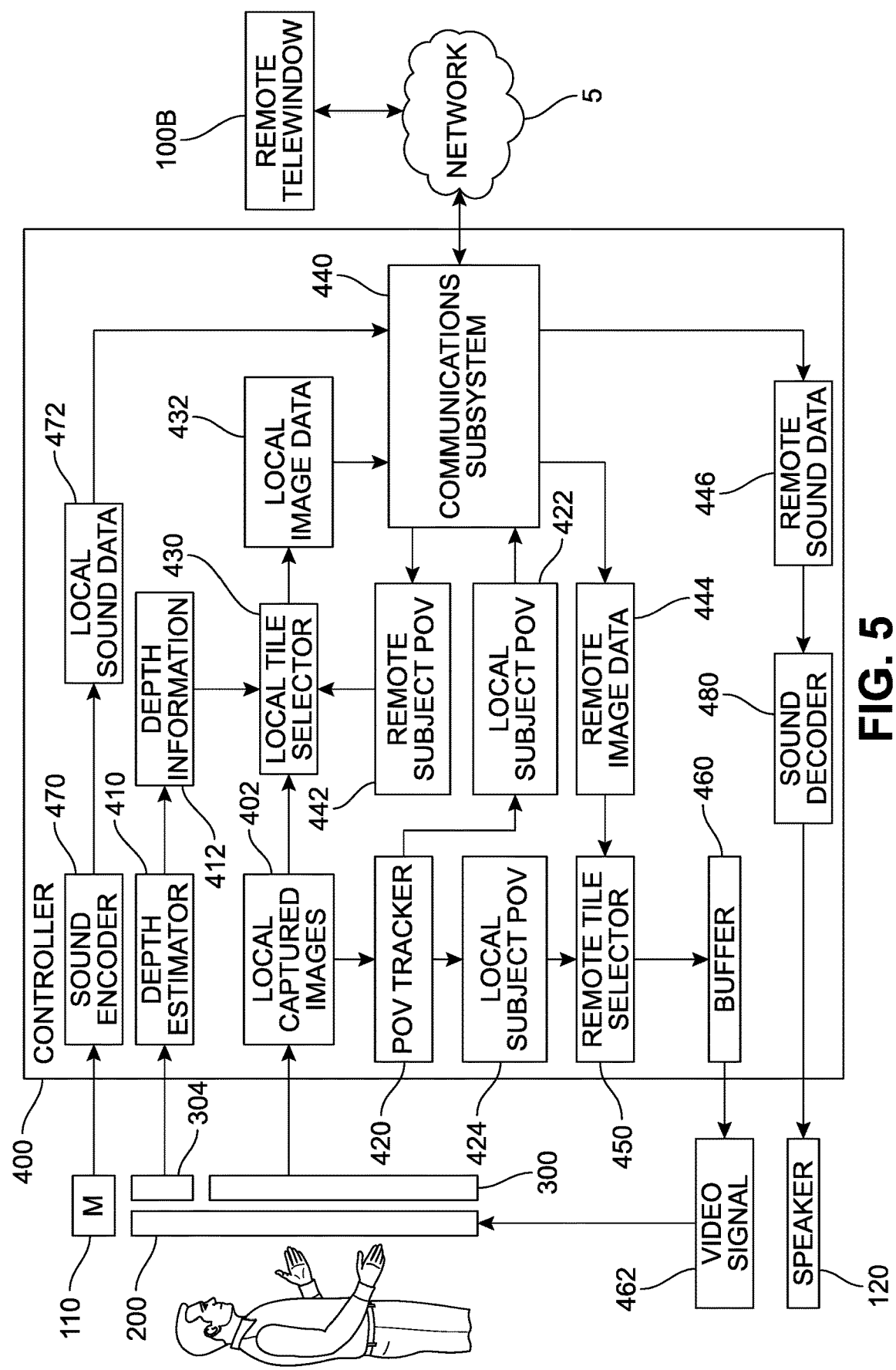
FIG. 5 illustrates an example controller of the telepresence device illustrated in FIG. 3.

FIG. 5 illustrates an example schematic diagram showing features included in an example controller 400 implementing various features described herein. The controller 400 may include any of the features described above for the telepresence devices 100A, 100B shown in FIG. 2B. Although aspects of features illustrated in FIG. 5 may be described with a focus on being applied to generate one current frame image, it is understood that these features would be similarly applied to generate additional frame images, such as a series of frame images for a telepresence videoconferencing stream.

The controller 400 may include, for example, a depth estimator 410, a POV tracker 420, a local tile selector 430, a communications subsystem 440, and a remote tile selector 450. The depth estimator 410 may generate and output depth information 412 of the subjects on the local site 10, including the local subject 2. In some implementations, the depth estimator 410 may be connected to one or more depth cameras 304 (shown in FIG. 3) to receive the depth estimations of the local subject 2. The POV tracker 420 and the local tile selector 430 may receive local captured images 402 captured by the camera array 300. In some implementations, the local captured images 402 may include a stream of light field frame images captured by each light field camera 302, which may be output via a corresponding camera module 310.

Figure 6:
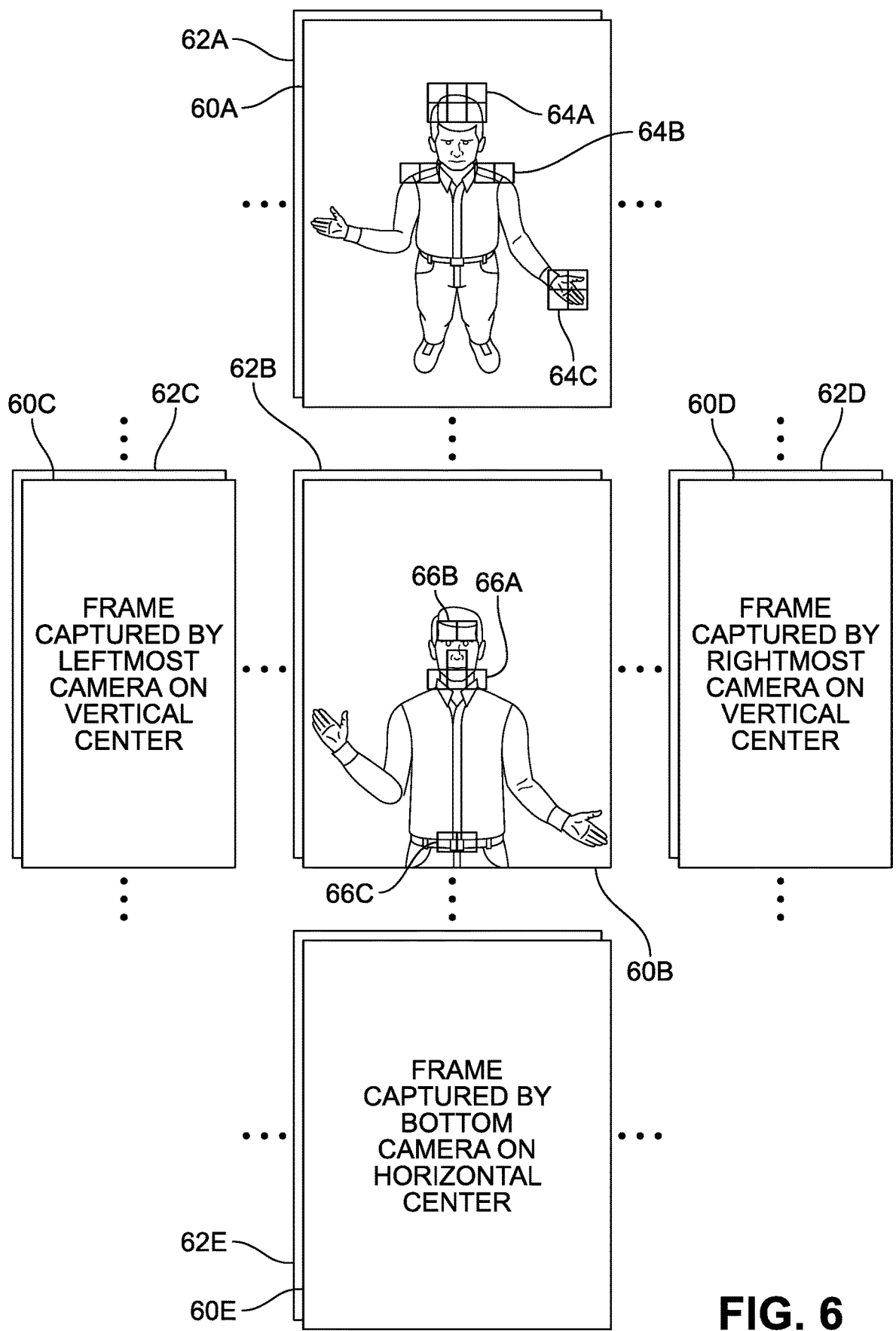
FIG. 6 illustrates example frame images captured by a camera array of the telepresence device illustrated in FIG. 4.

FIG. 6 illustrates examples of the local captured images 402 captured by each light field camera 302. As described above, the local captured images 402 may include a stream of sequential light field frame images captured by each light field cameras 302, which may be output in a digital video signal format via the camera modules 310. The frame images 60A, 60B, 60C, 60D, 60E (concurrently referred to as previous frame images 60) are example visual representations of the light field image frames captured in the previous sampling cycle by the light field cameras 302 located at the top and horizontal center, horizontal and vertical center, leftmost and vertical center, right most and vertical center, and bottom and horizontal center of the camera array 300, respectively. The frame images 62A, 62B, 62C, 62D, 62E (concurrently referred to as current light field frame images 62) represent example light field image frames captured in the current sampling cycle by the aforementioned light field cameras, respectively.

The image frames 60A, 62A are two sequential image frames of a continuous image frame stream generated by the light field camera 302 located at the top and horizontal center of the camera array 300. Similarly, the image frames 60B, 62B are two sequential image frames of a continuous image frame steam generated by the light field camera 302 located at the vertical and horizontal center of the camera array 300. As seen in FIG. 6, the image frame 60A shows top surfaces of the head, shoulder, shoes, etc. of the local subject 2, which the image frame 60B does not show. These unique portions of the image frame 60A may be selected or discarded to composite an image of the local subject 2 at the remote telepresence device 100B based on the POV of the remote subject 4, which will be discussed below in detail.

Referring back to FIG. 5, the POV tracker 420 may process and analyze the local captured images 402 to track the POV of the local subject 2 and determine a current POV of the local subject 2 and to estimate one or more future POVs of the local subject 2. The current and estimated future POVs of the local subject 2 are collectively referred to as local subject POV data 422 in FIG. 5.

Figure 7A:
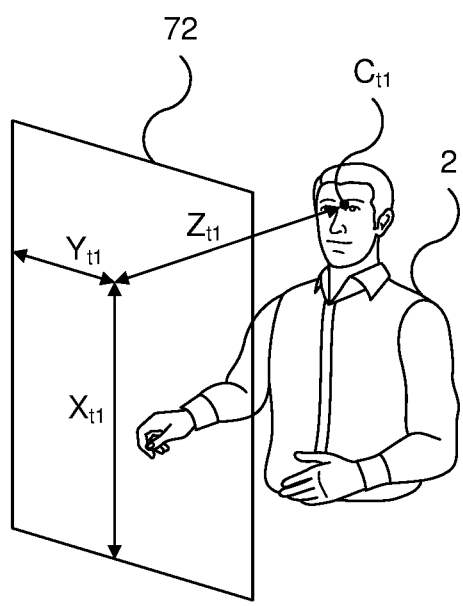
FIGS. 7A, 7B, 7C, 7D, 7E, 7F and 7G illustrate steps for determining current and estimated future point of view (POV) data of the local subject.

FIGS. 7A, 7B, 7C, 7D, 7E, 7F and 7G illustrate an example method for tracking a current POV and estimating one or more future POVs of the local subject 2, which may be performed by the POV tracker 420. It is noted that that the movements of the local subject 2 shown in FIGS. 7A, 7B, 7C, 7D, 7E, 7F and 7G are exaggerated for purposes of clarity and discussion, and do not necessarily reflect expected actual degrees of movement. In FIG. 7A, at a time t1, the POV tracker 420 may determine a location of a first POV point $C_{t1}$ of the local subject 2 relative to the local telepresence device 100A for the time t1. In the illustrated example, the first POV point Ca is described in terms of a three-dimensional Cartesian coordinate $(X_{t1}, Y_{t1}, Z_{t1})$ relative to a lower right position of the local telepresence device 100A from the view of the local subject 2. The X-Y plane 72 in this example is parallel to the front main surface of the display 200. It is noted that various other coordinate systems may be employed to similar effect. A POV point, such as the first POV point $C_{t1}$, may be a point between the eyes of the local subject 2 (as illustrated in FIG. 7A), a left eye of the local subject 2, a right eye of the local subject 2, or other location corresponding to a viewpoint of the of the local subject 2.

Figure 7B:
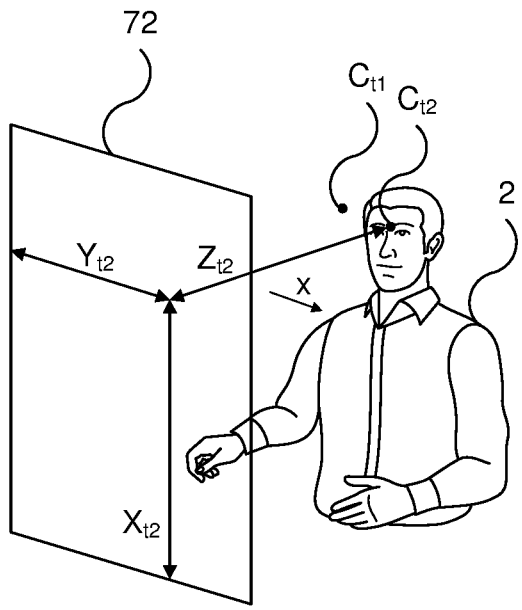

In FIG. 7B, at a time t2, the local subject 2 has moved from the position at time t1 in FIG. 7A; for example, laterally to the left as indicated by arrow X. For the time t2, the POV tracker 420 may determine a location of a second POV point $C_{t2}$ of the local subject 2 relative to the local telepresence device 100A, with a corresponding three-dimensional coordinate $(X_{t2}, Y_{t2}, Z_{t2})$, much as described in FIG. 7A.

Figure 7C:
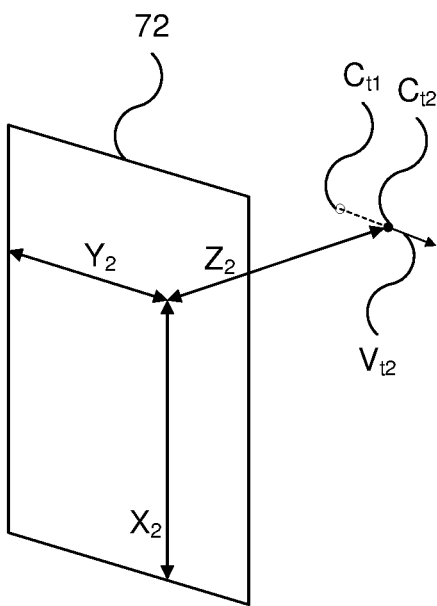

In FIG. 7C, also corresponding to the time t2, the local telepresence device 100A generates, based on movement of a POV point of the local subject 2 over time, motion prediction data suitable for estimating or predicting future locations of the POV point of the local subject 2. In this example, the motion prediction data includes the second POV point $C_{t2}$ of the local subject 2 (the most recently determined location for the POV point of the local subject 2) and a motion vector $V_{t2}$, calculated based on and reflecting the movement from the first POV point $C_{t1}$ to the second POV point $C_{t2}$; for example, the motion vector $V_{t2}$ might be calculated as a difference between the first POV point $C_{t1}$ and the second POV point $C_{t2}$. The motion vector $V_{t2}$ may be expressed in terms of the same coordinate axes used for the second POV point $C_{t2}$. Although the example illustrated in FIG. 7C uses a linear motion vector $V_{t2}$ for motion prediction data, in other examples more complex motion prediction models, and corresponding motion prediction data, may be generated. The local telepresence device 100A transmits the generated motion prediction data to the remote telepresence device 100B.

Figure 7D:
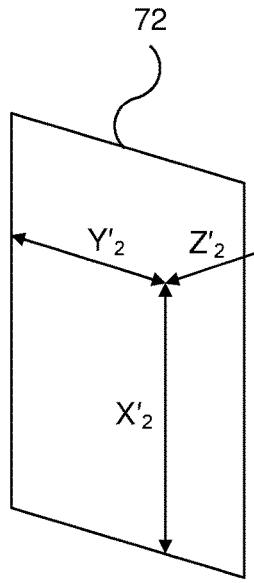

In FIG. 7D, at a time t3, the remote telepresence device 100B has received the motion prediction data from the local telepresence device 100A. In this example, the second POV point $C_{t2}$ and is converted to a coordinate system used by the remote telepresence device 100B (for example, orthogonal axes X', Y, and Z'), resulting in a three-dimensional coordinate (X'$_{t2}$, Y'$_{t2}$, Z'$_{t2}$). In some examples, offsets may be applied to one or more components of the coordinate (X$_{t2}$, Y$_{t2}$, Z$_{t2}$) to generate the coordinate (X'$_{t2}$, Y'$_{t2}$, Z'$_{t2}$). In some examples, a matrix transformation or other transformation may be applied to the coordinate (X$_{t2}$, Y$_{t2}$, Z$_{t2}$) to generate the coordinate (X'$_{t2}$, Y'$_{t2}$, Z'$_{t2}$).

Latency between the movements of the local subject 2 and images presented by the local telepresence device 100A to the local subject 2 becomes perceptible at around 30 milliseconds, although the amount at which it becomes perceptible may vary from person to person. To minimize this latency, portions of the image data captured by the remote telepresence device 100B at the time t3 are selected for rendering a light field image corresponding to a POV position of the local subject 2 at a future time corresponding to the display of the image data to the local subject 2, such as the time t9 illustrated in FIG. 7F. However, there are a number of sources of uncertainty for where that future POV position actually will be. For example, network latency in transmitting image data from the remote telepresence device 100B to the local telepresence device 100A may vary as a result of a number of unknown circumstances. Additionally, the actual movements of the local subject 2 may diverge from the motion prediction data generated at the time t2; for example, although the local subject 2 may move linearly along the motion vector $V_{t2}$, that movement may be faster or slower than predicted.

Figure 7E:
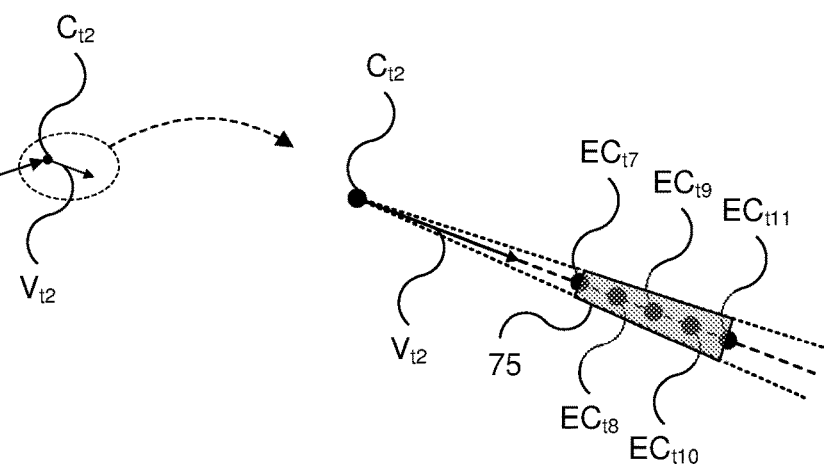

To address the uncertainty in the actual future POV position that will occur when the image data is rendered by the local telepresence device 100A, the remote telepresence device 100B identifies multiple POV positions corresponding to various possible POV positions, and selects portions the image data that would be used by the local telepresence device 100A to render an image corresponding to each of the multiple POV positions. FIG. 7E illustrates an example in which five POV positions are identified by the remote telepresence device 100B based on the motion prediction data received from the local telepresence device 100A. Based on the second POV point $C_{t2}$ and the motion vector $V_{t2}$, future POV positions for the local subject 2 are estimated or predicted for times t7, t8, t9, t10, t11, resulting in respective estimated POV points $EC_{T7}$, $EC_{T8}$, $EC_{T9}$, $EC_{T10}$, $EC_{T11}$. For example, the time t9 may correspond to an expected time the image data will be used by the local telepresence device 100A, and times t7 and t8 being slightly earlier than t9, and times t10 and t11 being slightly later than time t9. These five POV points may then be used to select image data for transmission to the local telepresence device 100A.

Further, there may be uncertainty or error in the motion prediction data generated at the time t2 and/or the local subject 2 may make an unexpected or unpredictable movement that does not coincide with the motion prediction data. To better ensure that the selected portions of the image data include the image data needed to render POV positions that deviate from the motion prediction data, a broader range of future POV positions may be identified and used for selecting the portions of the image data transmitted to the local telepresence device 100A. In FIG. 7E, a volume 75 is shown, from which multiple representative POV points are selected and used for selecting portions of the image data transmitted to the local telepresence device 100A. In the example illustrated in FIG. 7E, the volume 75 is a portion of a cone extending from the second POV point $C_{t2}$ corresponding to times t7 through t11, which widens over time to reflect increasing uncertainty over time in the actual POV position of the local subject 2 and provides a volume more certain to encompass POV positions within a degree of uncertainty. With this, the amount of image data transmitted to the local telepresence device 100A will likely increase, but it also allows operation of the local telepresence device 100A to be more robust against unexpected movements of the local user 2.

It is noted that although in the above examples the remote telepresence device 100B calculated future POV points and/or volume 75, in some implementations such calculations may instead be performed by the local telepresence device 100A. For example, the motion prediction data generated by the local telepresence device 100A may expressly specify POV points, a range of POV points, and/or a volume of POV points to be used by the remote telepresence device 100B for selecting portions of image data. However, by providing more freedom to the remote telepresence device 100B to identify the future POV positions, it allows that selection to better dynamically accommodate situations such as changes network latency observed between the local telepresence device 100A and the remote telepresence device 100B.

Figure 7F:
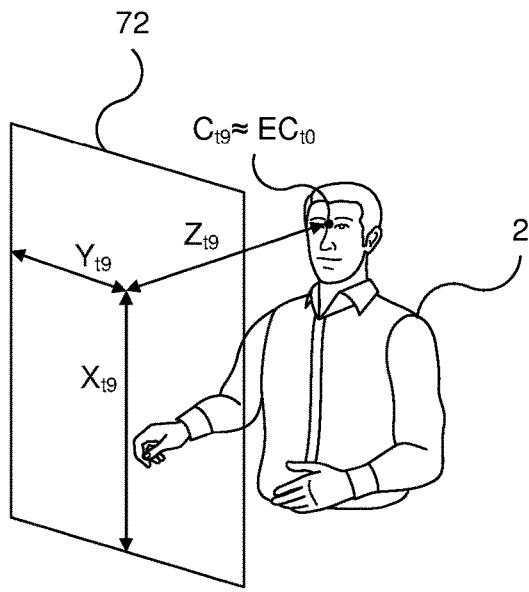

In FIG. 7F, at a time t9 and based on an actual POV point $C_{t9}$ determined for the time t9, the local telepresence device 100A may use a subset of the image data received from the remote telepresence device 100B to render and display an image of the remote subject 4 corresponding to the POV point $C_{t9}$. Although the image data was captured at an earlier time t3, by rendering a light field with respect to a viewpoint for the POV point $C_{t9}$, latency in response to movements of the local subject 2 are substantially reduced.

Figure 7G:
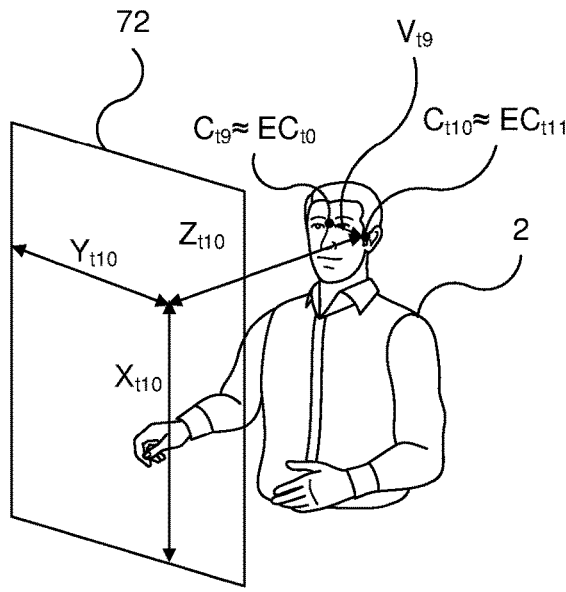

FIG. 7G illustrates another approach to rendering an image at the local telepresence device 100A based on the actual POV point $C_{t9}$ determined for the time t9. It may take a significant amount of time (for example, multiple frame display periods) to render an image corresponding to the POV point $C_{t9}$, resulting in the image of the remote subject 4 rendered for the POV point $C_{t9}$ being displayed at a later time, for example, at a time t10. Between the time t9 and the time 10, the local subject 2 may move to a POV point $C_{t10}$ that is different from the previous POV point $C_{t9}$. If so, an image rendered for the previous POV point $C_{t9}$ may no longer accurately correspond to the POV point $C_{t10}$, resulting in a latency perceptible to the local subject 2. When this occurs, the local subject 2 may feel that the displayed image of the remote subject 4 is less responsive and interactive.

To further reduce latency, motion prediction data (illustrated as a vector $V_{t10}$ in FIG. 7G) may be used at the time t9 to determine an estimated future POV point $C_{t10}$ for the time t10. The image for display to the local subject 2 is then rendered for a light field with respect to a viewpoint for the estimated future POV point $C_{t10}$, rather than the POV point $C_{t9}$. Where the estimated future POV point $C_{t10}$ is reasonably accurate, which is more likely on short time scales, the image of the remote subject 4 displayed on the local telepresence device 100A becomes more responsive to the movement of the local subject 2.

Referring to FIG. 5, the local subject POV data (e.g., previous, current and estimated future POVs of the local subject 2) may be sent to the communications subsystem 440. The communications subsystem 440 may receive remote subject POV data 442 from the remote telepresence device 100B. The remote subject POV data 442 may be generated in the same or similar manner as the local subject POV data 422.

The local tile selector 430 may receive the local captured image 402 (from the camera array 300), the depth information 412 (from the depth estimator 410) and the remote POV data 442 from (the communications subsystem 440). Based on the remote subject POV data 442 and/or the depth information 412, the local tile selector 430 may select tiles from different frame images (for example, previous or current frame images 60, 62 shown in FIG. 6). A tile refers to a segmented portion of a frame image. A frame image may include a plurality of tiles arranged in predetermined numbers of rows and columns. Each tile may be identifiable by its location in the frame image. Each tile may have a predetermined size, for example, 16 pixels arranged in a 4×4 array, 64 pixels arranged in an 8×8 array, or the like. Alternatively, the size and shape of the tiles may vary depending on, for example, subject movement frequency, level of details involved, etc. For example, smaller tiles may be used to select frequently changing, detailed or dense portions (e.g., hair, eye, hands, etc.). Larger tiles may be used to select stationary or monotonous portions (e.g., wall, background, etc.).

Based on at least one of the previous, current and estimated future remote subject POVs of the remote subject POV data 442, the local tile selector 430 may select those tiles that are likely to be used by the remote telepresence device 100B to composite an image of the local subject 2. For example, FIG. 6 shows a plurality of tiles 66A, 66B, 66C selected from the frame image 60B based on the on the remote subject POV data 442. Those tiles that are not likely to be used may be discarded. For example, when the remote subject POV data 442 indicates that the remote subject 12 is looking up, the remote telepresence device 100B may not need the tiles showing the top of the head, shoulder and hands. Hence, those tiles (for example, tiles 64A, 64B, 64C in the frame image 60A shown in FIG. 6) that correspond to these unnecessary portions may be discarded. Those selected tiles may be output as local image data 432 to the communication subsystem 440, which may compress and package the local image data 432 with other local data, including the local subject POV data 422, and transmit to the remote telepresence device 100B via the network 5.

In some implementations, the local tile selector 430 may also add the depth information 412 to the selected tiles. For example, the local tile selector 430 may obtain, from the depth estimator 410, the depth information 412 of each pixel of the selected tiles and add the depth information 412 to pixel color information (e.g., RGB). The added depth information may make it less time and resource-consuming to process the selected tiles when the remote telepresence device 100B processes the local image data 432 to composite images of the local subject 2.

In some implementations, the local telepresence device 100A may be constructed and operating to display an image of the remote subject 4. For example, the communications subsystem 440 may receive, unpackage and decompress data from the remote telepresence device 100B. The data from the remote telepresence device 100B may include remote image data 444. Similar to the local image data 432, the remote image data 444 may include a plurality of tiles selected from the frame images of the remote subject 4 at the remote telepresence device 100B. The tiles may be selected at the remote telepresence device 100B based on at least one of the previous, current or estimated future POV of the local subject POV data 422 sent by the local telepresence device 100A. The remote image data 444 may include the tiles that may be needed to construct an image of the remote subject 4 at the local telepresence device 100A.

The communications subsystem 440 may send the remote image data 444 to the remote tile selector 450. The remote tile selector 450 may receive the local subject POV data 424, which may include the previous, current and estimated future POVs of the local subject 2. Based on the local POV data 424, the remote tile selector 450 may process the remote image data 444 to select tiles necessary to composite an image of the remote subject 4. The remote tile selector 450 may then combine the selected tiles to composite a frame image of the remote subject 4, which may then be sent to a buffer 460. The buffer 460 may output the frame images as a video signal 462 to the display 200. The display 200 may process the video signal 462 to display a video image that may preserve the 3D geometric shape and eye gazing of the remote subject 4 and may be responsive to the movements by the local subject 2. In the same or similar manner, the remote telepresence device 100B may display a video image that may preserve the 3D geometric shape and eye gazing of the local subject 22, which may also be responsive to the movements by the remote subject 4.

The controller 400 may further include additional components necessary for teleconferencing, for example, a sound encoder 470, a sound decoder 480, etc. The sound encoder 470 may be connected to a microphone 110, which may be positioned on, for example, a hidden inner surface of the enclosure 500, to capture a voice from the local subject 2. The sound encoder 470 may encode and send the captured voice signal as local sound data 472 to the communications subsystem 440. The local sound data 472 may then be compressed and packaged by the communications subsystem 440 and sent to the remote telepresence device 100B via the network 5. The data package from the remote telepresence device 100B may include remote sound data 446, which may be unpackaged and decompressed by the communications subsystem 440 and sent to the sound decoder 480. The sound decoder 480 is connected to a speaker 120, which may be, similar to the microphone 110, positioned on a hidden inner surface of the enclosure 500. The sound decoder 480 may decode the remote sound data 446 and output an audio signal to the speaker 120 to reproduce a voice of the remote subject 4 at the local site 10.

In some implementations, the remote device 100B may be a non-telepresence device that may not provide the remote subject POV data. For example, the remote device 100B may be a virtual reality (VR) or augmented reality (AR) device. To work with the VR/AR machine, the local tile selector 430 (shown in FIG. 5) may select a plurality of tiles from the captured light field images and convert the selected tiles to local subject image data that can be used by the VR/AR device to render and display a 3D visual representation (e.g., 3D avatar) of the local subject 2. The local subject image data may include the local subject POV data, which may enable the 3D visual representation of the local subject 2 displayed on the VR/AR device to maintain eye gazing with the remote VR/AR user.

Figure 8:
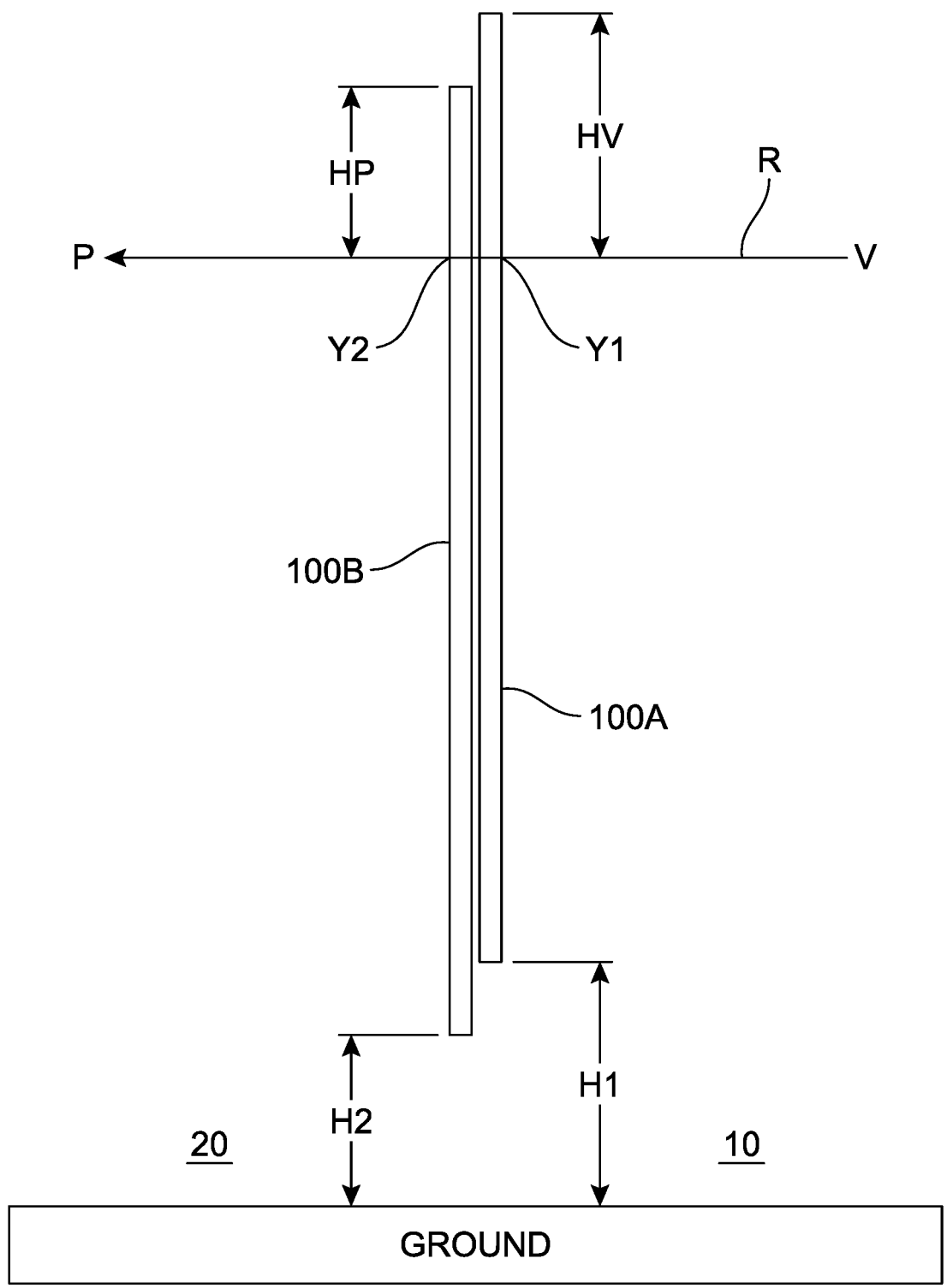
FIG. 8 illustrates an example of calibrating two remotely located telepresence devices positioned at different heights.

FIG. 8 illustrates an example of calibrating the local and remote telepresence devices 100A, 100B positioned at different heights. In some installation situations, two identically sized telepresence devices 100A, 100B may be positioned substantially perpendicular to but at different heights H1, H2 from the ground, which may cause a substantial eye level difference between the local and remote subjects 12, 22. Assuming that the center of projection (COP) of the light field cameras 302 is very close (e.g., less than 2 mm) to the display 200, the distance between the display 200 and the COP may be neglected by a simple calibration. For example, the ray R from a point V at the local site 10 to a point P at the remote site 20 passes through a point Y1 of the local telepresence device 100A and a point Y2 of the remote telepresence device 100B. A length HV represents the distance between the top of the telepresence device 100A and the ray passing point Y1, and a length HP represents the distance between the top of the telepresence device 100B and the ray passing point Y2, where the difference between the lengths HV, HP is the same as the difference between the heights H1, H2. Hence, a simple linear shift may be carried out during the installation calibration to compensate the telepresence device height variations. The height of each telepresence device may be determined manually using a ruler or the like. Alternatively, a sonar device or other measuring devices may be used to obtain a more accurate height estimation.

The telepresence devices constructed and operating as described above may provide improved immersion experiences, and the local and remote subject may feel the same level of trust and empathy as being face-to-face to each other at the same location. Hence, the telepresence devices may reduce or even eliminate time-consuming and costly travels for business or personal purposes.

Figure 9:
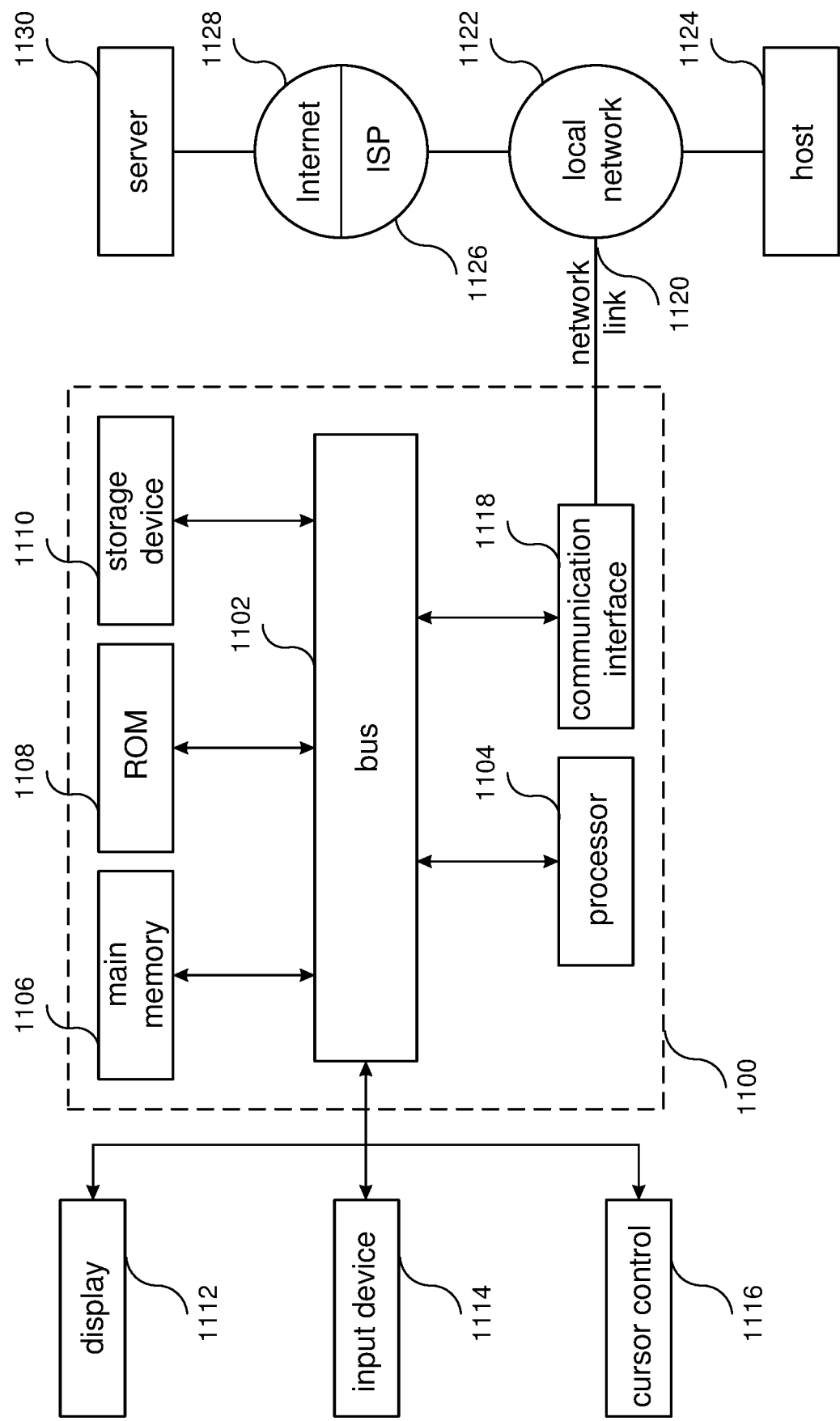
FIG. 9 illustrates a block diagram showing an example computer system upon which aspects of this disclosure may be implemented.

FIG. 9 illustrates a block diagram showing an example computer system 1100 upon which aspects of this disclosure may be implemented. Computer system 1100 includes a bus 1102 or other communication mechanism for communicating information, and a processor 1104 coupled with bus 1102 for processing information. Computer system 1100 also includes a main memory 1106, such as a random-access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. The computer system 1100 can implement, for example, one or more of, or portions of the local and remote telewindows 100A, 100B.

Computer system 1100 can further include a read only memory (ROM) 1108 or other static storage device coupled to bus 1102 for storing static information and instructions for processor 1104. A storage device 1110, such as a flash or other non-volatile memory can be coupled to bus 1102 for storing information and instructions.

Computer system 1100 may be coupled via bus 1102 to a display 1112, such as a liquid crystal display (LCD), for displaying information. One or more user input devices, such as the example user input device 1114 can be coupled to bus 1102, and can be configured for receiving various user inputs, such as user command selections and communicating these to processor 1104, or to a main memory 1106. The user input device 1114 can include physical structure, or virtual implementation, or both, providing user input modes or options, for controlling, for example, a cursor, visible to a user through display 1112 or through other techniques, and such modes or operations can include, for example virtual mouse, trackball, or cursor direction keys.

The computer system 1100 can include respective resources of processor 1104 executing, in an overlapping or interleaved manner, respective program instructions. Instructions may be read into main memory 1106 from another machine-readable medium, such as storage device 1110. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 1110. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 1100 can also include a communication interface 1118 coupled to bus 1102, for two-way data communication coupling to a network link 1120 connected to a local network 1122. Network link 1120 can provide data communication through one or more networks to other data devices. For example, network link 1120 may provide a connection through local network 1122 to a host computer 1124 or to data equipment operated by an Internet Service Provider (ISP) 1126 to access through the Internet 1128 a server 1130, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A telepresence device comprising:
a display;
a camera array comprising a plurality of cameras;
a processor; and
a memory in communication with the processor, the memory comprising executable instructions that, when executed by the processor, cause the processor to control the telepresence device to perform functions of:
capturing, using the camera array, a local subject to generate a plurality of local subject capture images;
receiving, via a communication network from a remote device, remote subject point of view (POV) data comprising an estimated future POV of a remote subject;
based on the received remote subject POV data, selecting, from the plurality of local subject capture images, a plurality of candidate local tiles for further selection by the remote device based on the remote subject POV data; and
sending, via the communication network to the remote device, local image data comprising the plurality of candidate local tiles.

2. The telepresence device of claim 1, wherein the plurality of cameras comprises a light field camera.

3. The telepresence device of claim 1, wherein the plurality of cameras comprises a depth camera configured to determine a depth estimate between the camera array and the local subject.

4. The telepresence device of claim 1, wherein instructions, when executed by the processor, further cause the processor to control the telepresence device to perform a function of estimating a depth between the camera array and the local subject.

5. The telepresence device of claim 1, wherein the remote subject POV data further comprises a previous or current POV of the remote user.

6. The telepresence device of claim 1, wherein the camera array comprises a camera module including the camera and an image processor.

7. The telepresence device of claim 1, wherein instructions, when executed by the processor, further cause the processor to control the telepresence device to perform functions of:
tracking a POV of the local subject; and
sending local subject POV data to the remote device via the communication network, the local subject POV data comprising at least one of previous, current and estimated future POVs of the local subject.

8. A telepresence device comprising:
a display;
a camera array comprising a plurality of cameras;
a processor; and
a memory in communication with the processor, the memory comprising executable instructions that, when executed by the processor, cause the processor to control the telepresence device to perform functions of:
tracking, using the camera array, a point of view (POV) of a local subject;
generating, based on the POV of the local subject, local subject POV data comprising an estimated future POV of the local subject;
sending, via a communication network to a remote device, the local subject POV data;
receiving, via the communication network from the remote device, remote image data comprising a plurality of candidate remote tiles selected by the remote device based the local subject POV data;
based on the local subject POV data, selecting, from the plurality of candidate remote tiles, a plurality of remote tiles;
compositing an image of a remote subject based on the plurality of selected remote tiles; and
displaying, on the display, the composited image of the remote subject.

9. The telepresence device of claim 8, wherein the plurality of cameras comprises a light field camera.

10. The telepresence device of claim 8, wherein the camera array comprises a camera module including the camera and an image sensor.

11. The telepresence device of claim 8, wherein the local subject POV data further comprises a previous or current POV of the local subject.

12. The telepresence device of claim 8, wherein the remote image data includes a depth estimate between the remote device and the remote subject.

13. A telepresence device comprising:
a display;
a camera array comprising a plurality of cameras;
a processor; and
a memory in communication with the processor, the memory comprising executable instructions that, when executed by the processor, cause the processor to control the telepresence device to perform functions of:
capturing, using the camera array, a local subject to generate a plurality of local subject capture images;
receiving, via a communication network form the remote device, remote subject point of view (POV) data comprising an estimated future POV of a remote subject;
based on the remote subject POV data, selecting, from the plurality of local subject capture images, a plurality of candidate local tiles for further selection by the remote device based on the remote subject POV data;
sending, via a communication network to the remote device, local image data comprising the plurality of candidate local tiles;
tracking a POV of the local subject and generating local subject POV data;
sending, via the communication network to the remote device, the local POV data comprising an estimate future POV of the local subject;
receiving, via the communication network from the remote device, remote image data comprising a plurality of candidate remote tiles selected by the remote device based on the local POV data;
based on the local subject POV data, selecting, from the plurality of candidate remote tiles, a plurality of remote tiles;
compositing an image of the remote subject based on the plurality of selected remote tiles; and
displaying the composited image of the remote subject on the display.

14. The telepresence device of claim 13, wherein the plurality of cameras comprises a light field camera.

15. The telepresence device of claim 13, wherein the plurality of cameras includes a depth camera configured to determine a depth estimate between the camera array and the local subject.

16. The telepresence device of claim 13, wherein the instructions, when executed by the processor, further cause the processor to control the telepresence device to perform a function of estimating a depth between the camera array and the local subject, wherein the local image data comprises the estimated depth.

17. The telepresence device of claim 13, wherein the camera array comprises a camera module including the camera and an image processor.

18. The telepresence device of claim 13, wherein:
the instructions, when executed by the processor, further cause the processor to control the telepresence device to perform a function of sending, via the communication network to the remote device, the local POV data, and
the plurality of candidate remote tiles is selected, based on the local POV data, by the remote device based on the local POV data for further selection by the telepresence device.

19. A method of operating a telepresence device comprising a camera array, the method comprising:
capturing, using the camera array, a local subject to generate a plurality of local subject capture images;
receiving, via a communication network from a remote device, remote subject point of view (POV) data comprising an estimated future POV of a remote subject;
based on the received remote subject POV data, selecting, from the plurality of local subject capture images, a plurality of candidate local tiles for further selection by the remote device based on the remote subject POV data; and
sending, via the communication network to the remote device, local image data comprising the plurality of candidate local tiles.

20. The method of claim 19, further comprising estimating a depth between the camera array and the local subject.

21. The method of claim 20, wherein the local image data further comprises the estimated depth between the camera array and the local subject.

22. The method of claim 19, further comprising:
tracking a POV of the local subject; and
sending local subject POV data to the remote device, the local subject POV data comprising an estimated future POV of the local subject.

23. A method of operating a telepresence device comprising a display and camera array, the method comprising:
tracking, using the camera array, a point of view (POV) of a local subject;
generating, based on the POV of the local subject, local subject POV data comprising an estimated future POV of the local subject;
sending, via a communication network to a remote device, the local subject POV data;
receiving, via the communication network from the remote device, remote image data comprising a plurality of candidate remote tiles selected by the remote device based the local subject POV data;
based on the local subject POV data, selecting, from the plurality of candidate remote tiles, a plurality of remote tiles;
compositing an image of a remote subject based on the plurality of remote tiles; and
displaying, on the display, the composited image of the remote subject.

24. The method of claim 23, wherein the remote image data includes a depth estimate between the remote device and the remote subject.

25. The method of claim 23, further comprising:
capturing, using the camera array, the local subject to generate a plurality of local subject capture images;
receiving, via the communication network from the remote device, remote subject POV data comprising an estimated future POV of a remote subject;
based on the received remote subject POV data, selecting, from the plurality of local subject capture images, a plurality of candidate local tiles; and
sending, via the communication network to the remove device, local image data comprising the plurality of candidate local tiles for further selection by the remote device based on the remote subject POV data.

26. The telepresence device of claim 1, wherein, for selecting the plurality of candidate local tiles, the instructions, when executed by the processor, further cause the processor to control the telepresence device to perform a function of selecting, based a first estimate future POV of the remote subject, the plurality of candidate local tiles for further selection by the remote device based on a second estimate future POV of the remote subject.

27. The telepresence device of claim 8, wherein:
the received remote image data comprises the plurality of candidate remote tiles selected by the remote device based on a first estimated future POV of the local subject, and
for selecting the plurality of remote tiles, the instructions, when executed by the processor, further cause the processor to control the telepresence device to perform a function of selecting, from the plurality of candidate remote tiles, the plurality of remote tiled based on a second estimated future POV of the local subject.

28. The telepresence device of claim 13, wherein:
for selecting the plurality of candidate local tiles, the instructions, when executed by the processor, further cause the processor to control the telepresence device to perform a function of selecting, based a first estimate future POV of the remote subject, the plurality of candidate local tiles for further selection by the remote device based on a second estimate future POV of the remote subject,
the received remote image data comprises the plurality of candidate remote tiles selected by the remote device based on a first estimated future POV of the local subject, and
for selecting the plurality of remote tiles, the instructions, when executed by the processor, further cause the processor to control the telepresence device to perform a function of selecting, from the plurality of candidate remote tiles, the plurality of remote tiled based on a second estimated future POV of the local subject.

29. The method of claim 19, wherein selecting the plurality of candidate local tiles comprises selecting, based a first estimate future POV of the remote subject, the plurality of candidate local tiles for further selection by the remote device based on a second estimate future POV of the remote subject.

30. The method of claim 23, wherein the received remote image data comprises the plurality of candidate remote tiles selected by the remote device based on a first estimated future POV of the local subject, and
selecting the plurality of remote tiles comprises selecting, from the plurality of candidate remote tiles, the plurality of remote tiled based on a second estimated future POV of the local subject.

* * * * *